(12) United States Patent
Kim et al.

(10) Patent No.: US 11,871,314 B2
(45) Date of Patent: *__Jan. 9, 2024__

(54) RESOURCE ALLOCATION METHOD FOR V2X COMMUNICATION IN WIRELESS COMMUNICATION SYSTEM AND APPARATUS THEREFOR

(71) Applicant: LG ELECTRONICS INC., Seoul (KR)

(72) Inventors: Youngtae Kim, Seoul (KR); Hanbyul Seo, Seoul (KR); Myoungseob Kim, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 32 days.

This patent is subject to a terminal disclaimer.

(21) Appl. No.: 17/403,523

(22) Filed: Aug. 16, 2021

(65) Prior Publication Data

US 2021/0377710 A1  Dec. 2, 2021

Related U.S. Application Data

(63) Continuation of application No. 16/346,656, filed as application No. PCT/KR2017/012485 on Nov. 6, 2017, now Pat. No. 11,115,789.

(Continued)

(51) Int. Cl.
*H04W 4/40* (2018.01)
*H04L 5/00* (2006.01)
(Continued)

(52) U.S. Cl.
CPC ............ *H04W 4/40* (2018.02); *H04L 5/0051* (2013.01); *H04L 5/0055* (2013.01); *H04L 5/10* (2013.01); *H04W 28/26* (2013.01)

(58) Field of Classification Search
CPC ..... H04W 4/40; H04W 28/26; H04W 72/042; H04L 5/0051; H04L 5/0055; H04L 5/10; H04L 1/1887; H04L 5/0007; H04L 5/0044
(Continued)

(56) References Cited

U.S. PATENT DOCUMENTS

2012/0213148 A1* 8/2012 Saito ..................... H04L 5/0023
370/315
2015/0180635 A1* 6/2015 Fujishiro ............... H04L 5/0055
370/329
(Continued)

FOREIGN PATENT DOCUMENTS

WO     2016022849 A1    2/2016

OTHER PUBLICATIONS

R1-166826: 3GPP TSG RAN WG1 Meeting #86, Gothenburg, Sweden Aug. 22, 26, 2016, LG Electronics, "Resource selection details for UE autonomous resource selection mode in PCS-based V2V," pp. 1-4.

*Primary Examiner* — Mang Hang Yeung
(74) *Attorney, Agent, or Firm* — BRYAN CAVE LEIGHTON PAISNER LLP

(57) ABSTRACT

The present invention relates to a resource allocation method of a vehicle-to-everything (V2X) transmission terminal in a wireless communication system and an apparatus therefor. More specifically, the method comprises the steps of: transmitting, to a V2X receiving terminal, a first V2X signal for a V2X service; receiving, from the V2X receiving terminal, an acknowledgment/negative-acknowledgment (ACK/NACK) for a V2X signal; and, if the NACK is received from the V2X receiving terminal, allocating, for a second V2X (Continued)

signal, a second time-frequency resource reserved in association with a first time-frequency resource for the first V2X signal.

10 Claims, 11 Drawing Sheets

Related U.S. Application Data

(60) Provisional application No. 62/450,578, filed on Jan. 26, 2017, provisional application No. 62/436,366, filed on Dec. 19, 2016, provisional application No. 62/417,340, filed on Nov. 4, 2016.

(51) Int. Cl.
*H04L 5/10* (2006.01)
*H04W 28/26* (2009.01)

(58) Field of Classification Search
USPC .......................................................... 370/329
See application file for complete search history.

(56) References Cited

U.S. PATENT DOCUMENTS

| | | |
|---|---|---|
| 2015/0271818 A1 | 9/2015 | Tavildar et al. |
| 2016/0173239 A1 | 6/2016 | Kim et al. |
| 2016/0295624 A1 | 10/2016 | Novlan et al. |
| 2017/0188391 A1* | 6/2017 | Rajagopal ......... H04W 74/0816 |
| 2018/0206176 A1* | 7/2018 | Panteleev ......... H04W 72/1268 |
| 2018/0351723 A1* | 12/2018 | Feng ....................... H04W 8/24 |

* cited by examiner

FIG. 2
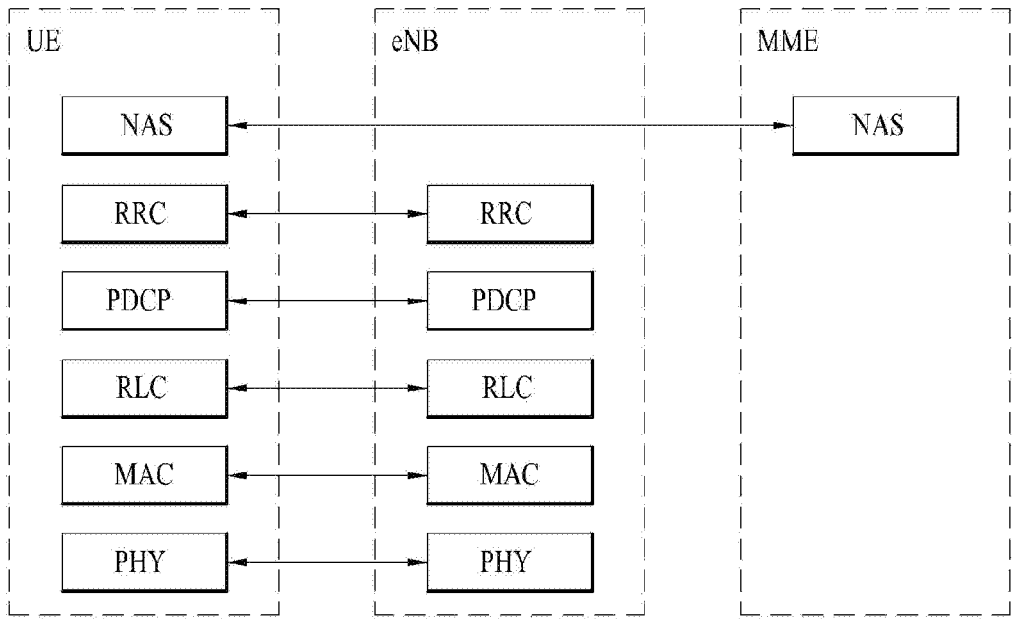
(a) Control plane protocol stack
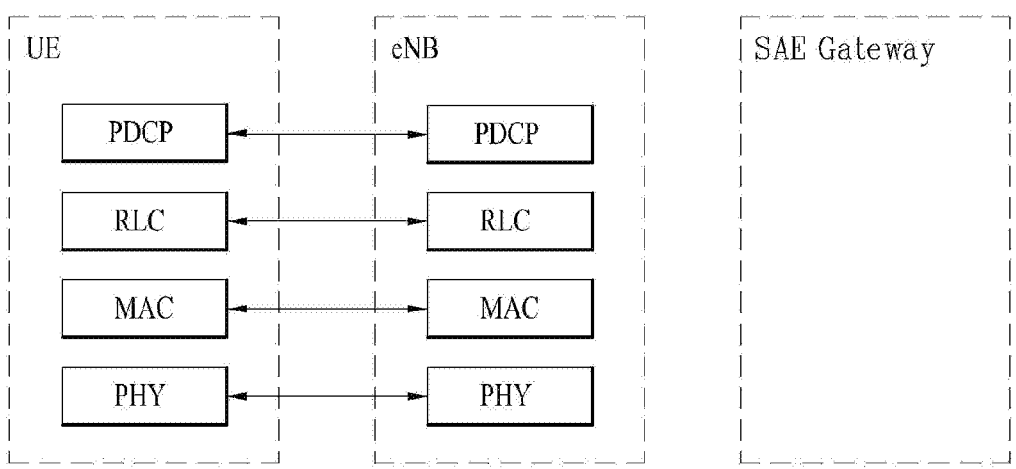
(b) User plane protocol stack

FIG. 8
(a) 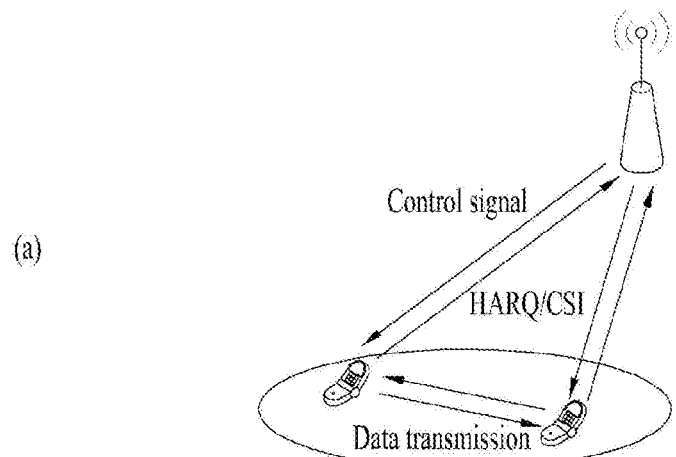
(b) 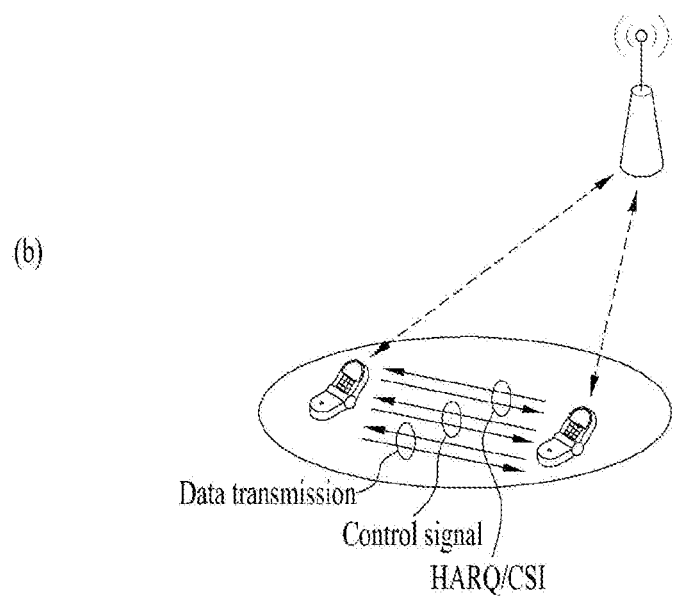

RESOURCE ALLOCATION METHOD FOR V2X COMMUNICATION IN WIRELESS COMMUNICATION SYSTEM AND APPARATUS THEREFOR

This application is a continuation application of U.S. application Ser. No. 16/346,656, filed on May 1, 2019, which claims priority to National Stage Application of International Application No. PCT/KR2017/012485, filed on Nov. 6, 2017, which claims the benefit of U.S. Provisional Application No. 62/417,340, filed on Nov. 4, 2016, U.S. Provisional Application No. 62/436,366, filed on Dec. 19, 2016 and U.S. Provisional Application No. 62/450,578, filed on Jan. 26, 2017, all of which are hereby incorporated by reference in their entirety for all purposes as if fully set forth herein.

TECHNICAL FIELD

The present invention relates to a wireless communication system and, more particularly, to a method of allocating a resource in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DETAILED DESCRIPTION OF THE INVENTION

Technical Problems

Hereinafter, a method of allocating a resource for V2X communication in a wireless communication system and an apparatus therefor will be proposed based on the above-described discussion.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

According to an aspect of the present invention, provided herein is a method of allocating a resource by a vehicle-to-everything (V2X) transmitting user equipment (UE) in a wireless communication system, including transmitting a first V2X signal for a V2X service to a V2X receiving UE; receiving acknowledgement/negative-acknowledgement (ACK/NACK) for the V2X signal from the V2X receiving UE; and upon receiving NACK from the V2X receiving UE, allocating, for a second V2X signal, a second time-frequency resource reserved in association with a first time-frequency resource for the first V2X signal.

The allocating may include checking whether control information is present in a control channel for the second V2X signal; and, if the control information is present, allocating a resource for at least one of a data channel or an ACK/NACK channel for the second V2X signal. A demodulation reference signal (DM-RS) sequence for the first V2X signal and a DM-RS sequence for the second V2X signal may be equally configured.

The second time-frequency resource may be reserved only for a control signal for the second V2X signal.

The method may further include receiving information indicating a resource for the first V2X signal from a base station (BS).

A first resource pool for the first time-frequency resource and a second resource pool for the second time-frequency resource may be configured to have different resource sizes. The first resource pool and the second resource pool may be resource pools configured only for a control channel.

At least two of a control channel, a data channel, or an ACK/NACK channel, included in the second V2X signal, may be time-division-multiplexed (TDMed).

At least two of a control channel, a data channel, and an ACK/NACK channel, included in the second V2X signal, may be time-division-multiplexed (TDMed).

A control channel included in the first V2X signal may include information indicating the second V2X time-frequency resource to the V2X receiving UE.

The method may further include, upon receiving neither ACK nor NACK from the V2X receiving UE, transmitting the second V2X signal including a control channel; and upon receiving NACK from the V2X receiving UE, transmitting the second V2X signal which does not include the control channel.

When a base station (BS) indicates a resource for the first V2X signal, ACK/NACK may be received through an uplink subframe configured for BS-UE communication.

The method may further include performing sensing for a time-frequency resource for the first V2X signal to configure the first time-frequency resource with which resources for all of initial transmission and retransmission reserved by second UEs do not overlap, and performing sensing for a time-frequency resource for the second V2X signal to configure the second time-frequency resource with which a resource for initial transmission reserved by the second UEs does not overlap.

The first V2X signal may be configured to be periodically transmitted and the second V2X signal may be configured to be aperiodically transmitted.

A control channel included in the first V2X signal may indicate a specific time duration associated with the first V2X signal, and the second V2X signal may be configured to be allocated to a second time-frequency resource included in the specific time duration.

ACK/NACK may further include information indicating a specific time duration for the second V2X signal.

Upon receiving ACK from the V2X receiving UE, the method may further include broadcasting information indicating that the second time-frequency resource reserved in association with the first time-frequency resource for the first V2X signal is released.

According to another aspect of the present invention, provided herein is a vehicle-to-everything (V2X) transmitting user equipment (UE) for performing resource allocation in a wireless communication system, including a radio frequency unit; and a processor combined with the radio frequency unit, wherein the processor is configured to transmit a first V2X signal for a V2X service to a V2X receiving UE, receive acknowledgement/negative-acknowledgement (ACK/NACK) for the V2X signal from the V2X receiving UE, and, upon receiving NACK from the V2X receiving UE, allocate, for a second V2X signal, a second time-frequency resource reserved in association with a first time-frequency resource for the first V2X signal.

Advantageous Effects

According to embodiments of the present invention, resource allocation for V2X communication can be efficiently performed in a wireless communication system.

Effects obtainable from the present invention are non-limited by the above mentioned effect. And, other unmentioned effects can be clearly understood from the following description by those having ordinary skill in the technical field to which the present invention

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE FOR CARRYING OUT THE INVENTION

Figure 1:
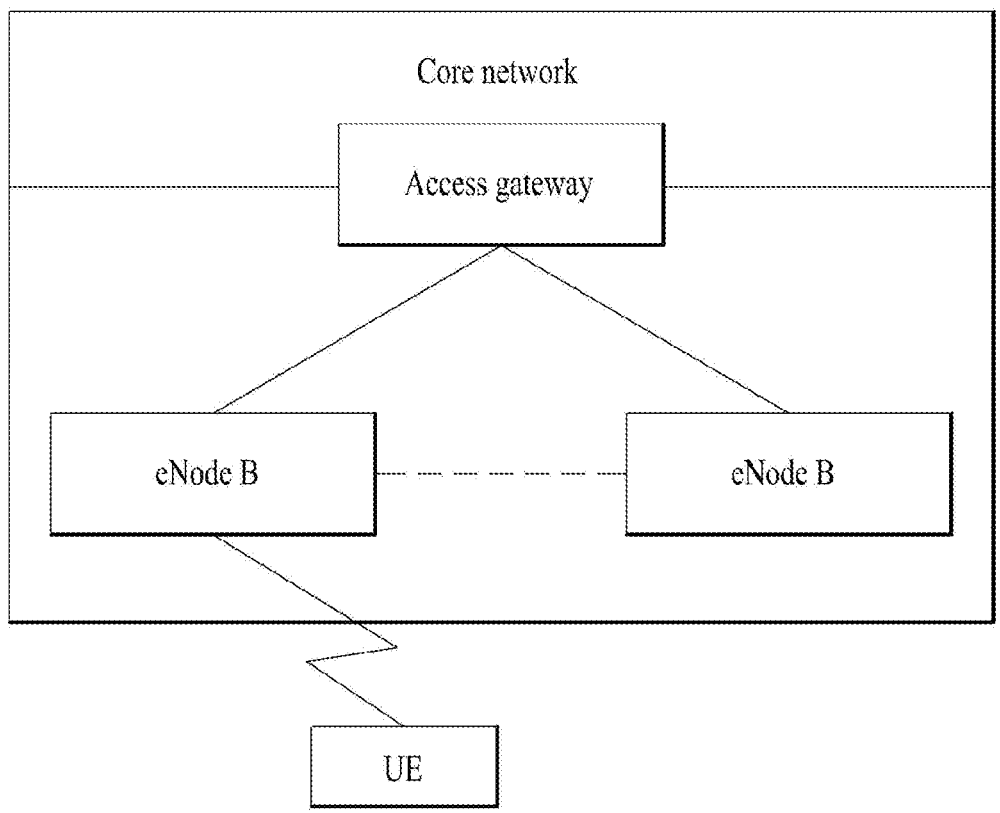
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts 01-DMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
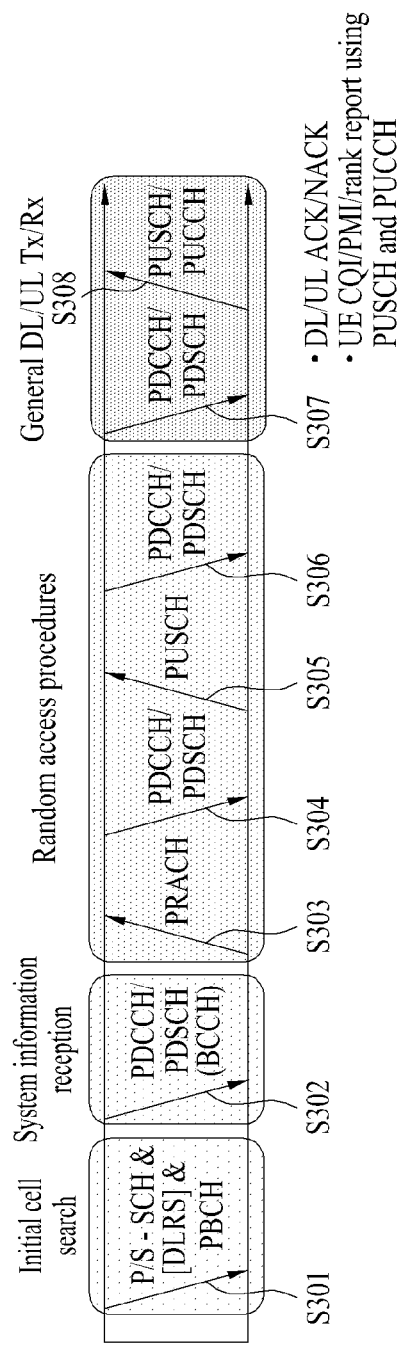
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
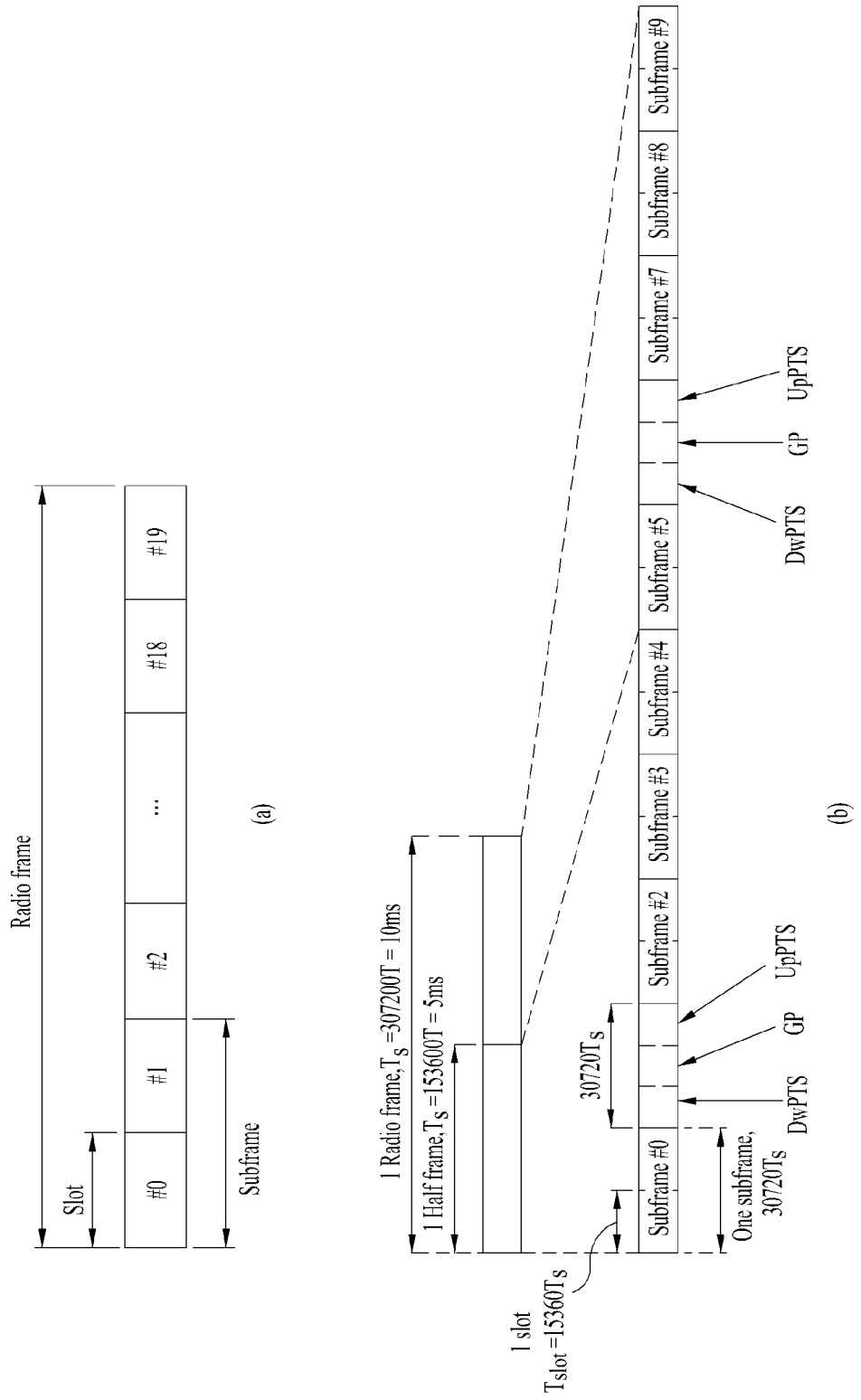
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
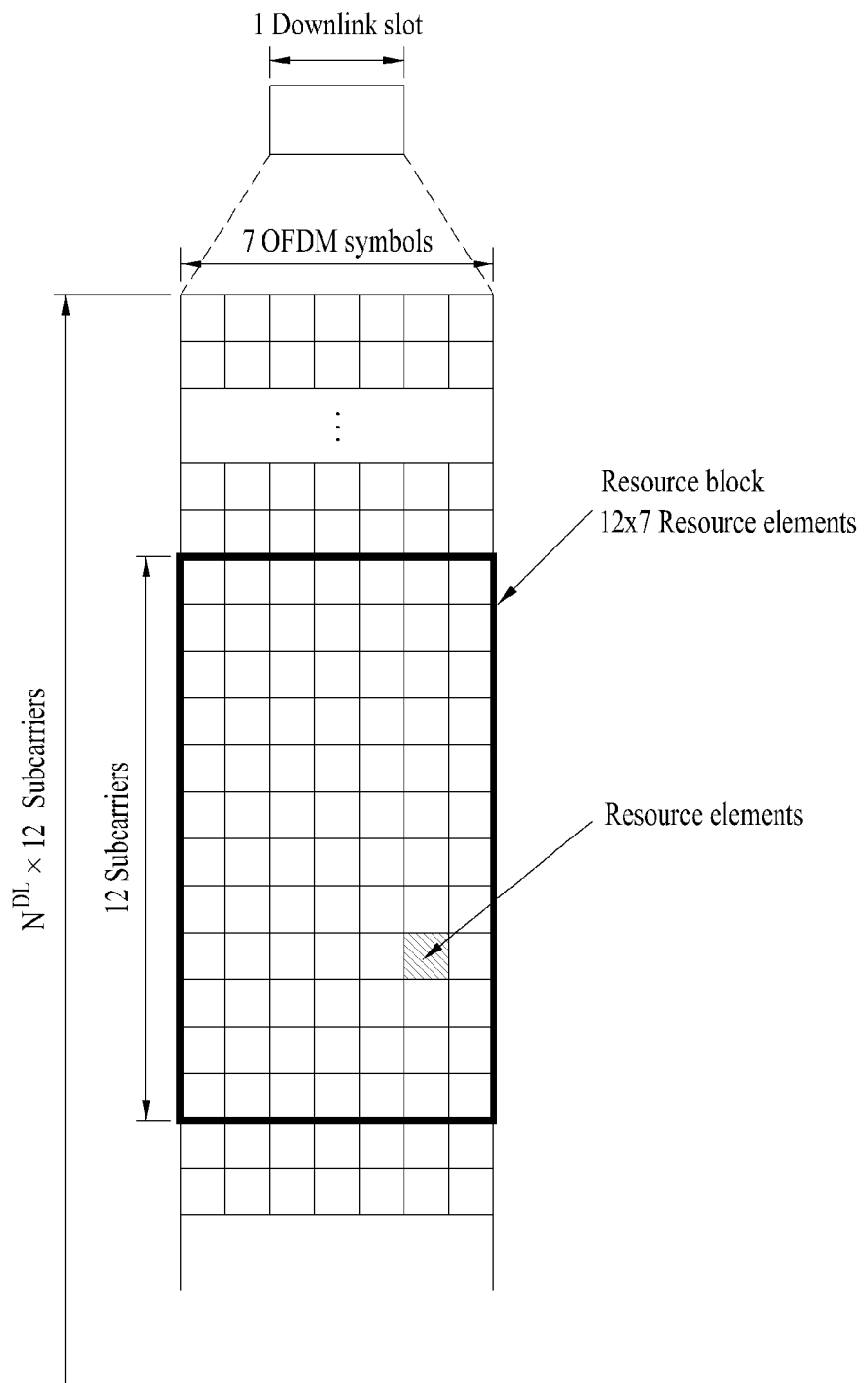
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

Figure 6:
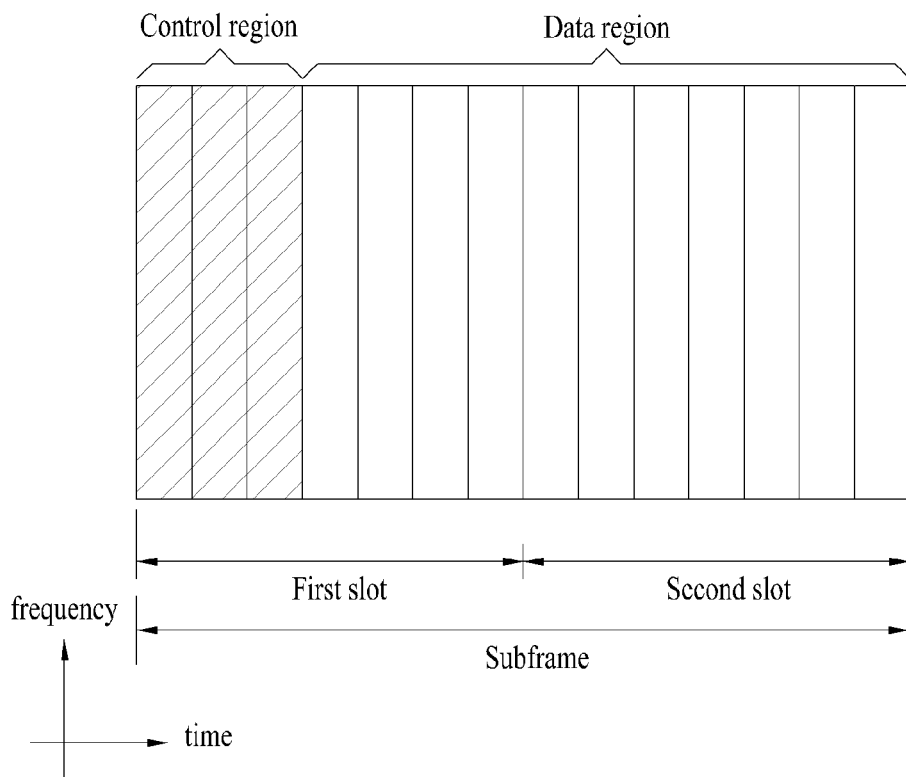
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
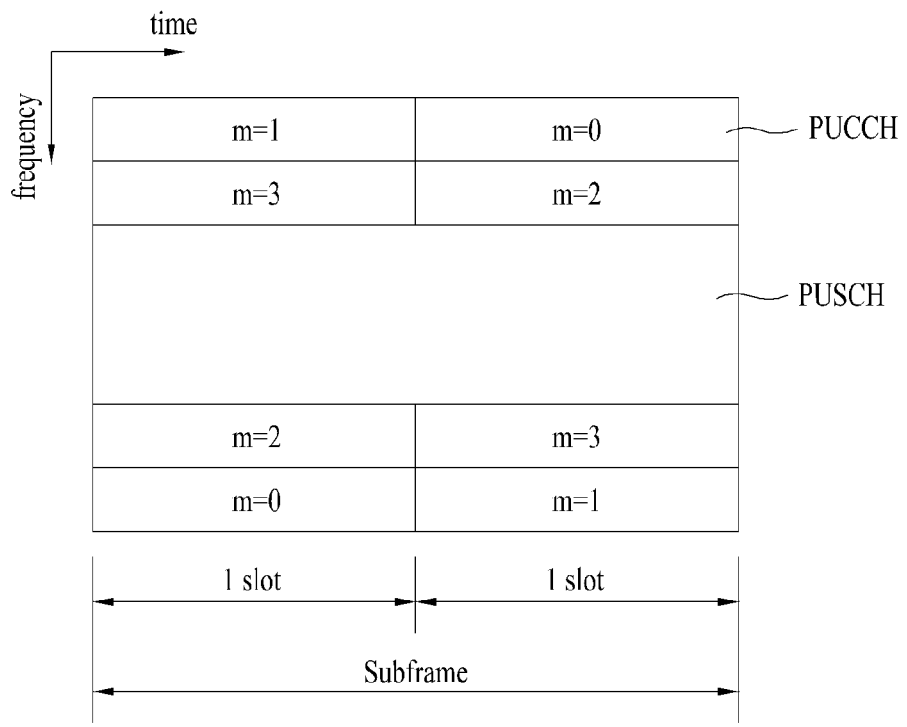
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
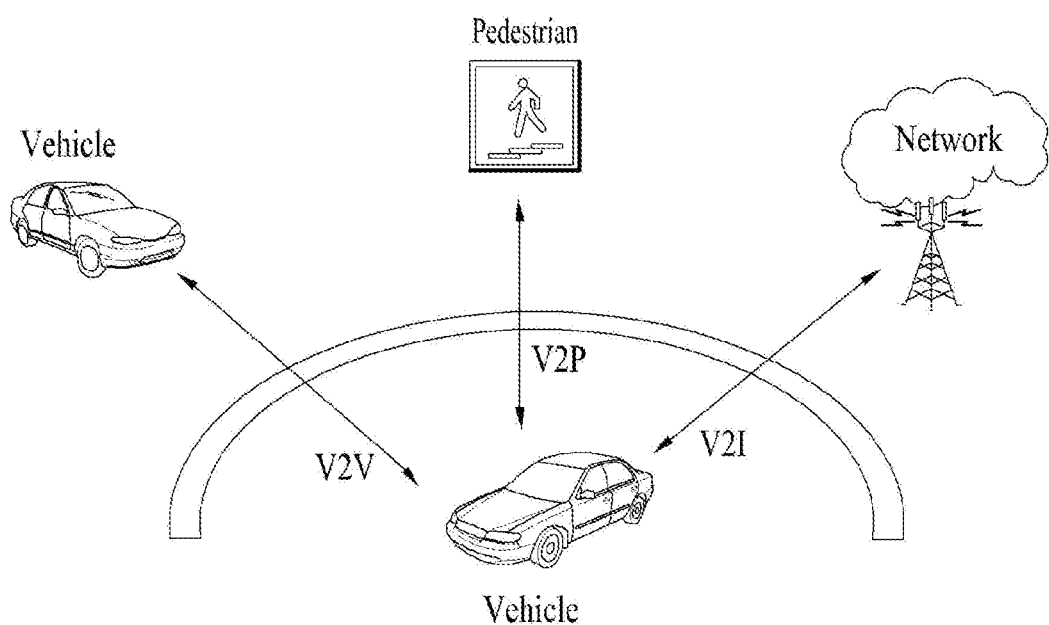
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
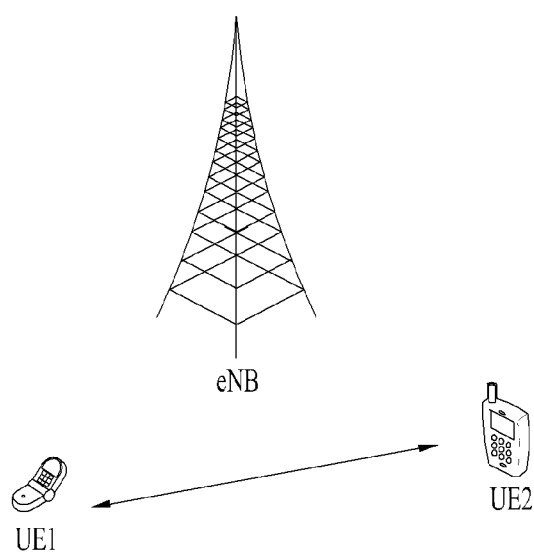
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
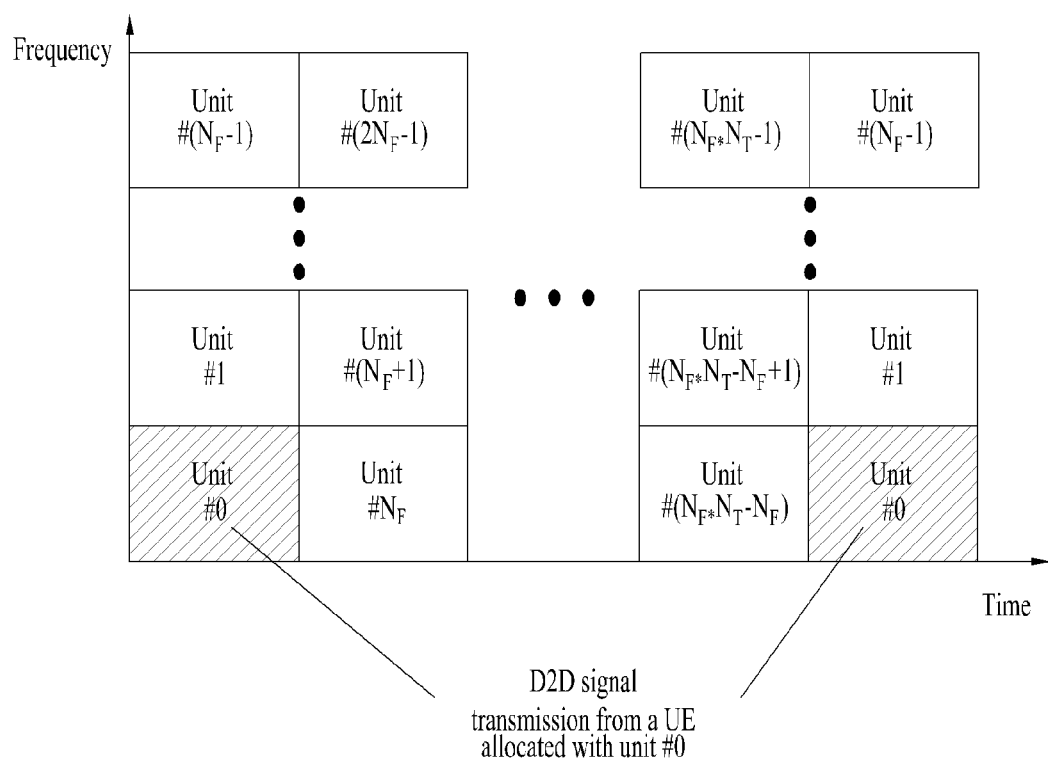

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel. So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and the determines whether to become a synchronization source by measuring RSRP of this signal and the like.

Moreover, in case of V2X communication, a control channel and a data channel are regarded as existing like D2D. Thus, when there exist a control channel and a data channel associated with the control channel, assume a situation that several vehicles come in and transmit periodic messages. Assuming that a vehicle is a UE, the UE can obtain resources location of the currently transmitted messages by decoding a currently transmitted control channel or performing energy sensing of a data channel. And, the UE may further obtain resource locations that will be transmitted by Tx UEs.

Based on the above description, the present invention provides a method of reserving a resource when retransmission for raising reliability is performed in the case in which a transmitting side performs initial transmission and then a receiving side or receiving sides feed back information indicating that reliability of initial transmission is problematic (e.g., the receiving side(s) transmit NACK to the transmission side). For convenience of description, the present invention will be described focusing on V2X (e.g., Mode 4) having a scenario without resource control of the eNB. However, the present invention does not exclude application to a scenario (e.g., Mode 3) in which resource control is performed by the eNB.

Currently, in LTE based V2X, ACK/NACK based HARQ is not used. However, ACK/NACK based HARQ needs to be performed in consideration of a future V2X service for high reliability. If a transmitting UE that has performed initial transmission receives NACK from receiving UE(s), the transmitting UE performs retransmission, thereby raising a decoding success probability.

In Mode 4 for current LTE based V2X, the transmitting UE selects a resource for transmission and the eNB is not involved in resource selection. Accordingly, when multiple transmitting UEs select transmission resources, there is a possibility of collision between the resources. To solve this problem, in V2X, it is determined whether a resource region is empty by measuring the power of a resource or decoding information of a control channel, prior to resource selection. Therefore, when the eNB is not involved in resource selection, it is desirable that a transmission resource have a determined pattern in order to avoid collision between resources. This is because it is efficient to determine a subsequent resource on which transmission will be performed if it is determined that transmission has been performed on a previous resource.

Accordingly, the present invention provides a method of reserving a resource for retransmission according to a resource of initial transmission in the case in which a transmitting UE performs retransmission after initial transmission due to transmission of NACK of receiving UE(s).

First Embodiment

According to the first embodiment of the present invention, a resource for initial transmission is associated with a resource for retransmission. For example, if a time-frequency location of the resource for initial transmission is determined, a time-frequency location of the resource for retransmission is determined in association therewith. For example, when a maximum number of retransmissions is N and the resource for initial transmission is determined, N resources for retransmission are automatically determined. Alternatively, the location of the resource for retransmission may be determined in initial transmission.

The resource for initial transmission includes all of a control channel, a data channel and an ACK/NACK channel. The resource for retransmission also includes the control channel, the data channel, and the ACK/NACK channel. However, if all of the control channel, the data channel, and the ACK/NACK channel are determined for initial transmission and retransmission, too many resources may be reserved for a series of transmissions including retransmission. Accordingly, when it is unnecessary to perform retransmission because NACK is not received after initial transmission, all resources reserved for up to N retransmissions will be wasted.

To supplement this problem, the transmitting UE may check whether control information is present in a control channel reserved for retransmission. If the control information is present, a data channel or an ACK/NACK channel associated with the control channel may be configured to be used. Then, even when there is a resource reserved for retransmission, if retransmission does not occur, channels other than the control channel may be used, so that resource use efficiency increases.

For example, i) in order to confirm whether control information is present in a reserved control channel, a UE may decode the control information. Alternatively, ii) in order to confirm whether the control information is present in the reserved control channel, the UE may test a threshold of reference signal received power (RSRP) of a demodulation reference signal (DMRS). If the RSRP is lower than the threshold, the UE determines that the control information is not present and, if the RSRP is higher than the threshold, the UE determines that the control information is present.

As described above, when the method of decoding the control information or comparing the DMRS RSRP with the threshold is used, a DMRS sequence of initial transmission may be equal to a DMRS sequence of retransmission. Then, from the viewpoint of the UE that checks whether the control information is present, since it is not necessary to blind-decode the DMRS while the UE checks where there is control information reserved for retransmission, complexity is reduced.

Alternatively, instead of the method of confirming whether the control information is present in the control channel, a reserved resource may be limited only to the control channel of retransmission and the resource location of the data channel or the ACK/NACK channel may be indicated during every retransmission. The above-described method of confirming whether the control information is present in the control channel enables only a UE performing initial transmission to use the data channel or the ACK/NACK channel corresponding to the control channel upon determining that there is no retransmission. However, the method of indicating the resource location of the data channel or the ACK/NACK channel during every retransmission enables even a UE performing retransmission to have an opportunity to use the data channel or the ACK/NACK channel corresponding to the control channel upon determining that there is no retransmission, thereby raising resource use efficiency.

Although only one of the above-described methods according to the first embodiment of the present invention may be performed, the plural methods may be used in association with traffic load. For example, if it is determined that traffic load is low, a transmitting UE may associate resources of initial transmission and retransmission with each other, whereas, if it is determined that traffic load is high, the transmitting UE may confirm whether the control information is present in the control channel or may indicate the resource location of the data channel or the ACK/NACK channel during every retransmission.

For determination of traffic load, an eNB may inform a UE of information about load or the UE itself may determine load by decoding the control channel or measuring the RSRP of the DMRS.

According to the first embodiment of the present invention, when the eNB designates a resource of a transmitting UE (e.g., Mode 3), the eNB may transmit the control channel thereof only once prior to initial transmission of the transmitting UE, rather than transmitting the control channel thereof with respect to both initial transmission and retransmission of the transmitting UE. Herein, since the resource for initial transmission is associated with the resource for retransmission, in control information of the control channel of the eNB, only the resource location of initial transmission may be designated. Alternatively, all of the locations of resources for initial transmission and retransmission may be simultaneously designated through the control channel of the eNB.

Second Embodiment

According to the second embodiment of the present invention, a resource pool may be separately configured for every retransmission in addition to reservation of retransmission.

That is, the amount of resource usage may be differently configured according to a transmission type (e.g., initial transmission or retransmission). For example, if a decoding failure probability of initial transmission is 1%, the resource for initial transmission occupies 99% of all resources and the resource for retransmission occupies 1% of all resources.

Considering this, resource pools having different resource sizes may be configured for initial transmission and retransmission. For example, if the size of the resource pool of initial transmission is 1, the size of the resource pool of retransmission may be configured to have a size of 1/99. In this case, a resource pool of a different size may be configured with respect to each number of retransmissions. If the resource pool is configured according to the number of transmissions, an effect of preventing resources for initial transmission and retransmission from colliding with each other may be obtained.

According to the second embodiment of the present invention, when resource pools are configured with respect to initial transmissions and each number of retransmissions, resource pools of a control channel, a data channel, and an ACK/NACK channel may be separately configured. However, in order to raise resource efficiency, only a resource pool of the control channel may be differently configured for initial transmissions and each number of retransmissions. Accordingly, the transmitting UE may confirm the control channel for every resource pool to check an empty area of the data channel or the ACK/NACK channel and use an empty resource.

In the second embodiment of the present invention, when the eNB designates a resource of the transmitting UE (e.g., Mode 3), the eNB may transmit a control channel thereof only once prior to initial transmission of the transmitting UE, rather than transmitting the control channel thereof with respect to both initial transmission and retransmission of the transmitting UE.

Since the resource for initial transmission is associated with the resource for retransmission, in the control information of the control channel of the eNB, the eNB may designate only the location of the resource of initial transmission. Alternatively, all of the locations of resources for initial transmission and retransmission may be simultaneously designated through the control channel of the eNB.

Third Embodiment

In the above-described first or second embodiment, time division multiplexing (TDM) is performed upon the control channel and the data channel (or ACK/NACK channel) of retransmission. This serves to use channels if it is determined that the data channel or the ACK/NACK channel can be used, upon determining whether the data channel and the ACK/NACK channel can be used after confirming the control information of the control channel of retransmission. This is because, if frequency division multiplexing (FDM) is performed, the case in which a channel cannot be used may occur even upon determining that the control information of the control channel of retransmission is not present.

Fourth Embodiment

In the above-described first or second embodiment, the resource for retransmission which will be used later may be designated through the control channel of initial transmission. All of the control channel, data channel, and ACK/NACK channel of retransmission may be designated and only the control channel may be designated so that the location of the data channel or ACK/NACK channel may be identified through the control information of the control channel. In addition, only the resource location of retransmission may be designated in initial transmission and the resource location of next retransmission may be designated again in retransmission.

According to the fourth embodiment of the present invention, when a receiving UE is aware of the location of the data channel or ACK/NACK channel of retransmission, even if the receiving UE fails to decode the control channel of retransmission, the receiving UE may determine only whether the control information of the control channel is present through a test of an RSRP threshold of the control channel and have an opportunity to receive data of retransmission.

Fifth Embodiment

According to the fifth embodiment of the present invention, a control channel may not be transmitted during retransmission. If it is assumed that an ACK/NACK based HARQ process is performed and the resource location of retransmission can be predicted in the control channel of initial transmission, since a resource location at which retransmission is performed is known upon occurrence of NACK, the control channel may not be transmitted to raise resource efficiency.

If the control channel (e.g., a physical sidelink control channel (PSCCH) of LTE) is not transmitted during retransmission, even when the eNB designates the location of a resource (e.g., downlink control information (DCI) of a physical downlink control channel (PDCCH) of LTE), it is desirable for the eNB not to transmit, during retransmission, the control channel without designating the location of the resource.

However, the receiving UE may miss reception of the control channel of the transmitting UE. In this case, the transmitting UE should transmit the control channel even during retransmission.

Accordingly, the fifth embodiment of the present invention may be applied to 5-A) to 5-D) described below.

5-A) Upon receiving ACK, the transmitting UE does not perform retransmission.

5-B) Upon receiving NACK, the transmitting UE does not transmit a control channel during retransmission.

5-C) Upon receiving neither ACK nor NACK, the transmitting UE transmits the control channel during retransmission. That is, the receiving UE may miss reception of the control channel of initial transmission or the transmitting UE may miss reception of ACK or NACK transmitted by the receiving UE. If the receiving UE misses reception of the control channel of initial transmission, the transmitting UE should transmit the control channel and, if the transmitting UE misses ACK/NACK transmitted by the receiving UE, the transmitting UE does not need to transmit the control channel. However, since the transmitting UE cannot distinguish between the above two cases, the transmitting UE transmits the control channel during retransmission in order to operate conservatively.

5-D) If the transmitting UE does not transmit the control channel during retransmission, the receiving UE may assume that control information of retransmission is equal to control information of initial transmission. The transmitting UE also performs retransmission under this assumption. However, during retransmission, a redundancy version (RV) may be changed. The RV number may be transmitted in association with a DMRS.

However, if the control channel is not transmitted during retransmission, HARQ buffer corruption may occur when retransmission is not actually performed. In other words, the receiving UE may determine that retransmission has been performed even though the transmitting UE has not performed retransmission. The receiving UE may perform decoding at a resource location reserved for retransmission and attempt to decode a decoded value (i.e., data including an error) together with data of initial transmission or another retransmission which will be generated later. To prevent this problem, 5-E) and 5-F) should also be considered.

5-E) That is, the receiving UE may determine whether retransmission has been performed by measuring energy of a DMRS on a resource reserved for retransmission. Alternatively, since another transmitting UE may perform transmission on the reserved resource, it is determined whether a transmitting UE corresponds to the receiving UE through a sequence of the DMRS. In this case, a DMRS sequence of the resource reserved for retransmission needs to be derived through an identification number of the transmitting UE.

5-F) Alternatively, during transmission, the DMRS sequence may be derived through an RV number of the transmitting UE. The receiving UE may determine whether retransmission is currently being performed or retransmission is reliable, by blind-decoding the RV number.

If the control channel is not transmitted during retransmission, a resource of retransmission which has been reserved may be empty due to success of initial transmission. To use this resource, another transmitting UE that has not reserved the resource may overhear an ACK/NACK resource for initial transmission of a transmitting UE that has reserved the resource for retransmission. If a decoding result is ACK, the other transmitting UE may determine that the resource will not be used and use the resource. In addition, the transmitting UE may overhear ACK/NACK for initial transmission of the other transmitting UE. If a decoding result is ACK, the transmitting UE that has performed initial transmission may use the resource reserved for retransmission.

Sixth Embodiment

According to the sixth embodiment of the present invention, when an ACK/NACK based HARQ process is performed, if the eNB designates a resource of a transmitting UE (e.g., Mode 3 of LTE), an ACK/NACK resource may not be allocated to a sidelink related resource and may be allocated to a legacy uplink. According to this embodiment, a control channel and a data channel are designed on a sidelink and an ACK/NACK channel operates on uplink so that a sidelink resource can be efficiently managed. A receiving UE transmits ACK/NACK of data on uplink and the eNB may determine retransmission and inform the transmitting UE of retransmission. Alternatively, the transmitting UE may overhear an uplink ACK/NACK resource to confirm whether retransmission is performed.

If the ACK/NACK resource is not operated on uplink during sidelink communication, the eNB should be aware of ACK/NACK to designate a retransmission resource of the transmitting UE every time NACK is generated. In this case, the eNB may overhear a sidelink ACK/NACK resource. Alternatively, the transmitting UE may inform the eNB of information about ACK/NACK. Then, the UE that performs retransmission may additionally allocate an ACK/NACK resource and inform the eNB of the information about ACK/NACK by transmitting ACK/NACK on the ACK/NACK resource. Alternatively, if the receiving UE generates NACK, the transmitting UE may perform retransmission by transmitting a scheduling request to the eNB, based on the ACK/NACK information received from the receiving UE.

The scheduling request may be a request for a retransmission resource, an operation of asking the eNB if the transmitting UE may actually perform retransmission since the retransmission resource has been allocated to the transmitting UE, or an operation of informing the eNB of whether to actually perform retransmission since the retransmission resource has been allocated to the transmitting UE.

In the operation of asking the eNB if the transmitting UE may actually perform retransmission since the retransmission resource has been allocated to the transmitting UE, the eNB may allocate the retransmission resource to another transmitting UE because retransmission may not be performed even if the retransmission resource has been allocated. Therefore, when retransmission occurs, there is a possibility of resource collision with another transmitting UE. To prevent this case, when retransmission occurs, the transmitting UE may perform the operation of asking the eNB if retransmission may be actually performed. In other words, when the eNB allocates a resource, a resource region for retransmission may be regarded as permitting allocation overlapping with a transmission resource of another transmitting UE.

Alternatively, overlapping of resource regions may be permitted only for resources for retransmission. This is because retransmission will be stochastically performed.

The operation of informing the eNB of whether to actually perform retransmission since the retransmission resource has been allocated to the transmitting UE is performed because a resource reserved for retransmission may be used for another transmitting UE if retransmission is not performed on the reserved resource. In this operation, if the eNB is aware of whether to use the resource for retransmission and then allocates the resource for another transmission, resource allocation for new transmission may be required after a start time of the retransmission resource elapses due to lack of time. To prevent this phenomenon, the retransmission resource may be reserved in a long transmit time interval (TTI) and, if there is no retransmission, retransmission may be performed in a short TTI at the rear part of the long TTI.

To cause the eNB to be aware of whether the transmitting UE performs retransmission, information as to how many retransmissions have been performed may also be transmitted during the scheduling request. Accordingly, when the sixth embodiment is combined with the first embodiment, the eNB can efficiently use resources because the eNB is aware of whether a resource for retransmission is used even if the eNB reserves the retransmission resource for the transmitting UE.

Seventh Embodiment

According to the seventh embodiment of the present invention, if a resource for retransmission is designed to be reserved, a sensing operation performed to search for an empty resource before selecting the retransmission resource may be changed. This is because the resource reserved for retransmission may be used or may not be used although whether a resource is certainly empty may be recognized when initial transmission is periodically reserved at each time.

Accordingly, according to this embodiment, when a sensing operation for selecting the resource for initial transmission of the transmitting UE is performed, all resources for initial transmission and retransmission, reserved by other transmitting UEs, may be basically avoided.

Alternatively, when the sensing operation for selecting the resource for retransmission of the transmitting UE is performed, resources for initial transmission, reserved by other transmitting UEs, may be avoided and resources for retransmission may be regarded as empty resources. This serves to loosen a sensing result for retransmission relative to initial transmission because the resource reserved for retransmission may be actually used or may not be used. Similarly, as compared with the initial transmission resource, the sensing operation for selection of the retransmission resource may be performed to select a resource having a high received signal strength indicator (RSSI) or RSRP. This serves to obtain an efficient operation by increasing selectable resources although a more unstable resource is selected during selection of the retransmission resource relative to the initial transmission resource.

Eighth Embodiment

Basically, in a current LTE system, initial transmission is assumed to be a periodic message and a resource selected for initial transmission may be regarded as being reserved at every period under the assumption that the resource for initial transmission will be transmitted at every period. If a resource for retransmission is reserved at every period together with the resource for initial transmission, too many reservation resources may be periodically configured.

Therefore, according to the eighth embodiment of the present invention, if it is assumed that retransmission is not always performed at every period, the resource for initial transmission may be periodically reserved and retransmission may be performed by selecting a resource according to a sensing result as in an aperiodic message.

Ninth Embodiment

According to the ninth embodiment of the present invention, when an ACK/NACK based HARQ process is performed and the eNB designates a resource of the transmitting UE (e.g., Mode 3 of LTE), the eNB may designate a resource only for initial transmission and may not separately designate a resource for retransmission. In this case, as in current LTE Mode 4, the transmitting UE may perform retransmission by directly selecting a resource through a sensing result for retransmission.

Tenth Embodiment

According to the tenth embodiment of the present invention, an operation may be performing without reserving a resource during retransmission. Signaling overhead generated by indicating the retransmission resource may be reduced by not separately reserving the resource during retransmission. However, in this case, since the receiving UE is not aware of when retransmission occurs, there is a problem in that the receiving UE that has transmitted NACK after a transmitting UE performs initial transmission should decode control information of every transmission. Further, if a special guideline is not provided, since the transmitting UE may not perform retransmission at a proper timing, a time duration for specifically selecting a resource for each transmission may be configured as a selection window so that retransmission may be performed within delay of a message transmitted by the transmitting UE after the transmitting UE receives NACK.

The transmitting UE may select the resource for retransmission within the time duration. The receiving UE receives retransmission by blind-search for the resource of retransmission within the selection window. The transmitting UE may inform the receiving UE of a message type through a control channel and configure a time duration of each message type through RRC signaling, so that the receiving UE may be aware of in which time duration retransmission for current transmission will be performed. (Alternatively, the transmitting UE may directly indicate, through the control channel, information about a time duration which is to be considered during selection of the resource for retransmission.)

In this case, as in the second embodiment, one resource pool may be separately configured for each retransmission or for all retransmissions.

For example, the transmitting UE may inform the receiving UE of a message type of initial transmission through the control channel during initial transmission. To select the resource for retransmission of each message type through RRC signaling, the transmitting UE may inform the receiving UE of i) information about delay, or a selection window consisting of ii) time or iii) time-frequency for selecting the resource for retransmission.

As another example, during initial transmission, the transmitting UE may directly inform the receiving UE of a delay or a remaining delay budget (or a selection window consisting of time or time-frequency for selecting the resource for retransmission) through the control channel.

When the receiving UE transmits ACK for transmission of the transmitting UE, operation may be stopped.

In contrast, when the receiving UE transmits NACK for initial transmission of the transmitting UE, the transmitting UE selects the resource for retransmission.

If the transmitting UE informs the receiving UE of the message type of initial transmission during initial transmission through the control channel, the receiving UE reads the control channel, reads the message type of initial transmission, and then selects the resource for retransmission through the delay or the selection window, based on information about the delay (or the selection window consisting of time or time-frequency for selecting the resource for retransmission) for each message type received through RRC signaling. A resource region in which the resource can be selected with respect to each delay or selection window may be separately defined.

If the transmitting UE directly informs the receiving UE of the delay or delay budget (or the selection window consisting of iii) time or iv) time-frequency for selecting the resource for retransmission) through the control channel during initial transmission, the receiving UE reads the control channel and selects the resource for retransmission through the delay or delay budget. A resource region in which the resource can be selected with respect to each delay or delay budget may be separately predefined.

When the receiving UE transmits ACK for retransmission of the transmitting UE, operation may be stopped.

When the receiving UE transmits NACK for retransmission transmission of the transmitting UE, the transmitting UE selects the resource for retransmission in the same way when the receiving UE transmits NACK for initial transmission. Then, the transmitting UE performs retransmission. Such an operation is repeated until the receiving UE transmits ACK or, if a maximum number of retransmissions is set, the operation is repeatedly performed by the maximum number of retransmissions.

Eleventh Embodiment

In the first to tenth embodiments, initial transmission and retransmission have been described based on one transport block (TB). However, for a service having short latency and high reliability, it may be efficient to transmit ACK/NACK after retransmitting one TB a few times, rather than transmitting one TB for every ACK/NACK.

Accordingly, the eleventh embodiment proposes that the number of TB transmissions prior to transmission of ACK/NACK be two or more. The number of transmissions may be dynamically designated through a control channel by the transmitting UE or the eNB or may be semi-statically indicated through RRC signaling.

Twelfth Embodiment

In the twelfth embodiment, after the receiving UE transmits ACK/NACK, the receiving UE may select as many resources for retransmission of the transmitting UE as retransmissions received thereby. In this case, since the receiving UE needs to be aware of the remaining delay budget, the transmitting UE may signal information about the delay budget to the receiving UE through the control channel.

Alternatively, the transmitting UE may inform the receiving UE of a transmitted message type through the control channel and the eNB may inform UEs of delay information of the message type through RRC signaling. In this case, only when the receiving UE transmits NACK, the resource for retransmission may be reserved. The receiving UE may signal the location of the resource reserved for retransmission together with an ACK/NACK signal. If the ACK/NACK signal is configured as a sequence, a plurality of sequences may be defined. The sequences may be divided into two groups which are mapped to ACK and NACK and the location of the resource for retransmission may be mapped to each sequence within an ACK or NACK sequence group. Alternatively, bit information for ACK/NACK and bit information for location information of the resource for retransmission may be mapped through modulation and then transmitted during transmission of ACK/NACK.

Thirteenth Embodiment

According to the thirteenth embodiment, if the resource for retransmission is reserved by the transmitting UE or the eNB, the resource may be configured not to be used. This is because, for example, ACK may be transmitted by the receiving UE. In this case, release information indicating that the resource for retransmission has been reserved but will not be used may be broadcast to UEs. Since this release information does not require many resources, the release information may be transmitted using a part of an ACK/NACK resource.

For example, the transmitting UE assumes that, during initial transmission, the resource for retransmission has been reserved by the eNB or the transmitting UE.

If initial transmission is determined to be ACK, the receiving UE signals that the resource for retransmission has been reserved but will not be used through the control channel (or an ACK/NACK resource).

If the receiving UE signals that the resource for retransmission will not be used through the control channel, the location of a resource of the control channel through which signaling is transmitted may be associated with a resource on which ACK/NACK has been transmitted or the transmitting UE may indicate the resource location through the control channel during initial transmission.

Alternatively, UEs may read transmission of ACK on an ACK/NACK resource on which ACK/NACK is transmitted, determine that retransmission will not be performed, and determine that the resource for retransmission will not be used because retransmission associated with ACK/NACK will not be performed. i) In this case, the location of the resource on which ACK/NACK is transmitted may be associated with the location of the resource for retransmission. Accordingly, the UEs may confirm that the resource for retransmission is not used by recognizing that ACK is transmitted on the ACK/NACK resource. ii) Alternatively, the UEs may confirm that the resource reserved for retransmission, indicated through scheduling assignment (SA) of transmission associated with the ACK/NACK resource will not be used by recognizing that ACK is transmitted on the ACK/NACK resource.

Figure 12:
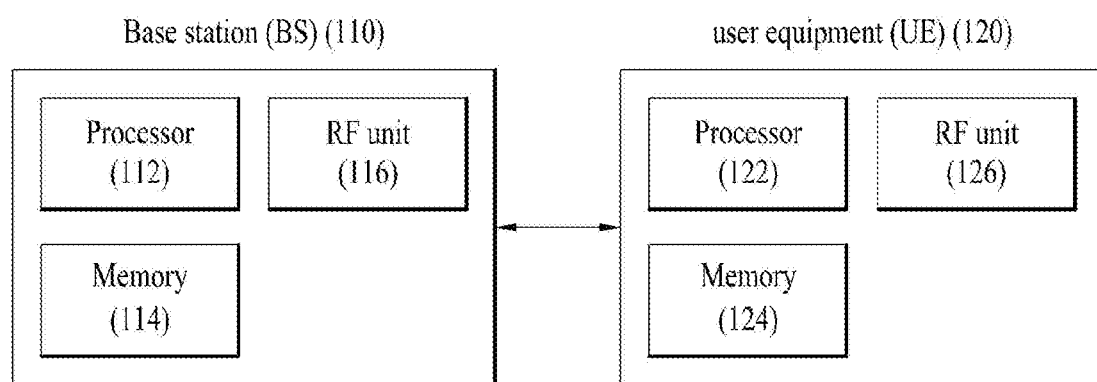
FIG. 12 shows a base station and a user equipment applicable to one embodiment of the present invention.

FIG. 12 illustrates a base station (BS) and a user equipment (UE) applicable to an embodiment of the present invention.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The above-described method and apparatus for allocating a resource for V2X communication in the wireless communication system are applicable to a variety of wireless communication systems.

The invention claimed is:

1. A method for transmitting Hybrid automatic repeat request (HARQ)-acknowledgement (ACK) information by a first user equipment (UE) in wireless communication system, the method comprising:
   receiving, from a base station (BS), a Radio Resource Control (RRC) parameter related to a maximum number of a plurality of sidelink time resources for a plurality of sidelink data channels;
   receiving, from the BS, first information related to a sidelink resource set including the plurality of sidelink time resources;
   determining the plurality of sidelink time resources based on the RRC parameter and an initial resource of the plurality of sidelink time resources,
   wherein the initial resource of the plurality of sidelink time resources is determined based on the first information;
   transmitting, to a second UE, a plurality of sidelink data channels based on the plurality of sidelink time resources;
   receiving, from the second UE, one or more feedback information in response to the plurality of sidelink data channels based on the first information;
   generating the HARQ-ACK information based on the one or more feedback information; and
   transmitting, to the BS via an uplink resource, the HARQ-ACK information,
   wherein the uplink resource is after a last sidelink time resource in the plurality of sidelink time resources.

2. The method of claim 1, further comprising:
   receiving, from the BS, second information related to a plurality of uplink resources including the uplink resource.

3. The method of claim 1, wherein the plurality of sidelink data channels are for one Transport Block (TB).

4. A first user equipment (UE) for transmitting Hybrid automatic repeat request (HARQ)-acknowledgement (ACK) information in a wireless communication system, the first UE comprising:
   at least one transceiver;
   at least one processor; and
   at least one computer memory operably connectable to the at least one processor and storing instructions that, when executed, cause the at least one processor to perform operations comprising:
      receiving, from a base station (BS) via the at least one transceiver, a Radio Resource Control (RRC) parameter related to a maximum number of a plurality of sidelink time resources for a plurality of sidelink data channels;
      receiving, from the BS via the at least one transceiver, first information related to a sidelink resource set including the plurality of sidelink time resources;
      determining the plurality of sidelink time resources based on the RRC parameter and an initial resource of the plurality of sidelink time resources,
      wherein the initial resource of the plurality of sidelink time resources is determined based on the first information;
      transmitting, to a second UE via the at least one transceiver, sidelink data channels based on the a plurality of plurality of sidelink time resources;
      receiving, from the second UE via the at least one transceiver, one or more feedback information in response to the plurality of sidelink data channels based on the first information;
      generating the HARQ-ACK information based on the one or more feedback information; and
      transmitting, to the BS via the at least one transceiver, the HARQ-ACK information via an uplink resource,
      wherein the uplink resource is after a last sidelink time resource in the plurality of sidelink time resources.

5. The first UE of claim 4, the operation further comprising:
   receiving, from the BS, second information related to a plurality of uplink resources including the uplink resource.

6. The first UE of claim 4, wherein the plurality of sidelink data channels are for one Transport Block (TB).

7. A first apparatus for transmitting Hybrid automatic repeat request (HARQ)-acknowledgement (ACK) information in a wireless communication system, the apparatus comprising:
   at least one processor; and
   at least one computer memory operably connectable to the at least one processor and storing instructions that, when executed, cause the at least one processor to perform operations comprising:
      receiving, from a base station (BS), a Radio Resource Control (RRC) parameter related to a maximum number of a plurality of sidelink time resources for a plurality of sidelink data channels;
      receiving, from the BS, information related to a sidelink resource set including the plurality of sidelink time resources;
      determining the plurality of sidelink time resources based on the RRC parameter and an initial resource of the plurality of sidelink time resources,
      wherein the initial resource of the plurality of sidelink time resources is determined based on the first information;
      transmitting, to a second apparatus, a plurality of sidelink data channels based on the plurality of sidelink time resources;
      receiving, from the second UE, one or more feedback information in response to the plurality of sidelink data channels based on the first information;
      generating the HARQ-ACK information based on the one or more feedback information; and
      transmitting, to the BS, the HARQ-ACK information via an uplink resource,
      wherein the uplink resource is after a last sidelink time resource in the plurality of sidelink time resources.

8. A non-transitory computer readable storage medium storing at least one computer program comprising instructions that, when executed by at least one processor, cause the at least one processor to perform operations, the operations comprising:
   receiving, from a base station (BS), a Radio Resource Control (RRC) parameter related to a maximum number of a plurality of sidelink time resources for a plurality of sidelink data channels;

receiving, from the BS, information related to a sidelink resource set including the plurality of sidelink time resources;

determining the plurality of sidelink time resources based on the RRC parameter and an initial resource of the plurality of sidelink time resources, wherein the initial resource of the plurality of sidelink time resources is determined based on the first information;

transmitting, to a second apparatus, a plurality of sidelink data channels based on the plurality of sidelink time resources;

receiving, from the second UE, one or more feedback information in response to the plurality of sidelink data channels based on the first information;

generating the HARQ-ACK information based on the one or more feedback information; and transmitting, to the BS, the HARQ-ACK information via an uplink resource, wherein the uplink resource is after a last sidelink time resource in the plurality of sidelink time resources.

9. A method for receiving Hybrid automatic repeat request (HARQ)-acknowledgement (ACK) information by a base station (BS) in wireless communication system, the method comprising:

transmitting, to a user equipment (UE), a Radio Resource Control (RRC) parameter related to a maximum number of a plurality of sidelink time resources for a plurality of sidelink data channels;

transmitting, to the UE, information related to a sidelink resource set including the plurality of sidelink time resources; and receiving, from the UE, via an uplink resource, the HARQ-ACK information generated based on one or more feedback information in response to a plurality of sidelink data channels, wherein the plurality of sidelink data channels are scheduled based on the plurality of sidelink time resources, wherein the plurality of sidelink time resources is determined based on the RRC parameter and an initial resource of the plurality of sidelink time resources, wherein the initial resource of the plurality of sidelink time resources is determined based on the first information, and wherein the uplink resource is after a last sidelink time resource in the plurality of sidelink time resources.

10. A base station (BS) for receiving Hybrid automatic repeat request (HARQ)-acknowledgement (ACK) information in wireless communication system, the BS comprising:

at least one transceiver;

at least one processor; and at least one computer memory operably connectable to the at least one processor and storing instructions that, when executed, cause the at least one processor to perform operations comprising:

transmitting, to a user equipment (UE), a Radio Resource Control (RRC) parameter related to a maximum number of a plurality of sidelink time resources for a plurality of sidelink data channels;

transmitting, to the UE via the at least one transceiver, information related to a sidelink resource set including the plurality of sidelink time resources; and receiving, from the UE via the at least one transceiver, the HARQ-ACK information generated based on one or more feedback information in response to a plurality of sidelink data channels, via an uplink resource, wherein the plurality of sidelink data channels are scheduled based on the plurality of sidelink time resources, wherein the plurality of sidelink time resources is determined based on the RRC parameter and an initial resource of the plurality of sidelink time resources, wherein the initial resource of the plurality of sidelink time resources is determined based on the first information, and wherein the uplink resource is after a last sidelink time resource in the plurality of sidelink time resources.

\* \* \* \* \*